United States Patent Office 3,560,592
Patented Feb. 2, 1971

3,560,592
CHLORINATED POLYVINYL CHLORIDE AND ETHYLENE/ACRYLATE COPOLYMER COMPOSITIONS
Pierre Decroly and Ghislain Danguy, Brussels, Belgium, assignors to Solvay & Cie, Brussels, Belgium, a corporation of Belgium
No Drawing. Filed Aug. 10, 1967, Ser. No. 659,612
Claims priority, application France, Aug. 16, 1966, 73,146; June 21, 1967, 111,315
Int. Cl. C08f 29/12
U.S. Cl. 260—876      12 Claims

ABSTRACT OF THE DISCLOSURE

The processability and impact strength of chlorinated polyvinyl chloride alone or in combination with polyvinyl chloride are improved by the addition of a copolymer of ethylene and an alkyl ester of acrylic acid or a substitution derivative of acrylic acid. Further improvement in impact strength is obtained by the further addition also of certain modifying agents which are graft copolymers based on diolefin polymers or copolymers or certain two or three component interpolymers.

BACKGROUND OF THE INVENTION

The present invention relates to new plastic compositions based on chlorinated polyvinyl chloride, which have high impact strength and are particularly easy to work, and also to shaped objects produced from such compositions.

It is well known that the working of chlorinated polyvinyl chloride requires very high temperatures. It is however practically impossible to effect extrusion at a temperature higher than 220° C. without risking partial or even total decomposition of the polymer. The working of chlorinated polyvinyl chloride therefore constitutes a problem which is difficult to solve. Moreover, the possibilities of using chlorinated polyvinyl chloride are sometimes limited by the inadequate mechanical properties of these resins.

It has therefore been found necessary to incorporate, in compositions based on chlorinated polyvinyl chloride, additives capable of facilitating working of the compositions and of giving the compositions excellent mechanical properties, particularly good impact strength.

It has already been proposed to incorporate polyvinyl chloride in compositions based on chlorinated polyvinyl chloride (French Pat. No. 1,378,939). The addition of polyvinyl chloride lowers the gelling temperature of chlorinated polyvinyl chloride, thus making possible its working at a temperature lower than its degradation temperature. These compositions however have mediocre impact strength.

It has also been attempted to give chlorinated polyvinyl chloride good impact strength, while retaining the desirable properties of the polymer, by incorporating ethylene-vinyl acetate copolymers (French Pat. No. 1,405,362). These mixtures have improved workability and impact strength properties but still do not have all the mechanical properties required for certain applications.

SUMMARY OF THE INVENTION

According to the invention, it has now been discovered that the incorporation of ethylene-alkyl acrylate copolymers in chlorinated polyvinyl chlorides yields mixtures which, in comparison with the aforesaid prior art compositions, possess better workability, higher impact strength, lower viscosity at high temperature and excellent resistance to thermal deformation.

DESCRIPTION OF PREFERRED EMBODIMENTS

Particular compositions according to the invention contain from 99.5 to 80% by weight of chlorinated polyvinyl chloride and from 0.5 to 20% by weight of ethylene-alkyl acrylate copolymer containing from 10 to 90% by weight of ethylene units.

The present invention also relates to compositions in accordance with those described above, in which from 0.5 to 50% by weight of the chlorinated polyvinyl chloride may be replaced by polyvinyl chloride.

The impact strength of these compositions may be further improved, without impairing their excellent properties of workability and resistance to thermal deformation by incorporating in them small amounts of a modifying agent, such as copolymers derived from acrylonitrile or from alkyl esters of acrylic acid or of substitution derivatives of acrylic acid. Preferably, the proportion of the modifying agent is from 0.1 to 5% by weight, based on the weight of the chlorinated polyvinyl chloride or of the mixture of chlorinated polyvinyl chloride and polyvinyl chloride.

The expression "alkyl acrylate" as used herein includes the alkyl esters not only of acrylic acid but also of substitution derivatives of acrylic acid, particularly of methacrylic acid.

The expression "chlorinated polyvinyl chloride employed herein is intended very generally to include all products of the chlorination of polyvinyl chloride. Chlorinated polyvinyl chlorides the chlorine contents of which are from 600 to 750 g./kg. are particularly suitable and those containing from 650 to 700 g. of chlorine per kg. are even more particularly suitable for the production of the compositions according to the invention.

The ethylene-alkyl acrylate or alkyl methacrylate copolymers which are used contain from 10 to 90% by weight of ethylene units, but it is particularly preferred that these copolymers contain from 50 to 90% by weight of ethylene units.

For most applications it is preferred to use compositions containing from 2.5 to 15% by weight of ethylene-alkyl acrylate or methacrylate copolymers.

The molecular weight of the polyvinyl chloride is not critical, but it is preferred to use a polyvinyl chloride characterized by a Fikentscher K number, measured in a solution of cyclohexane, of from 50 to 100.

Modifying agents which may be used in the present invention are selected from:

(a) Graft copolymers obtained by grafting on a diolefin polymer or copolymer at least one monomer selected from the group consisting of alkyl acrylates, styrene, acrylonitrile, and their substitution derivatives.

(b) Copolymers and terpolymers obtained by copolymerization of at least two monomers selected from the group consisting of alkyl acrylates, styrene, acrylonitrile, butadiene and their substitution derivatives.

The expression "diolefin polymer" as employed herein includes diolefin copolymers.

Among modifying agents which are particularly suitable for carrying out the invention, the following compounds may be cited:

Copolymers obtained by grafting styrene and methyl methacrylate, acrylonitrile and methyl methacrylate, styrene, acrylonitrile and methyl methacrylate, styrene and methyl and ethyl methacrylates on polybutadiene;

Butadiene-acrylonitrile, 2-chlorobutadiene-methyl methacrylate, butadiene-methyl methacrylate, and ethyl acrylate-methyl methacrylate copolymers.

Butadiene-styrene-acrylonitrile and butadiene-styrene-methyl methacrylate terpolymers.

The surprising effect of simultaneous addition of the ethylene-alkyl acrylate copolymer and the modifying agent is a substantial improvement of impact strength, whereas each of the constituents used separately gives not such good results.

The production of homogeneous mixtures of chlorinated polyvinyl chloride, ethylene-alkyl acrylate or methacrylate copolymer, and optionally modifying agents and polyvinyl chloride is particularly easy to achieve.

These mixtures may be prepared by any appropriate means known to those skilled in the art, for example by malaxation in the hot state at a temperature close to 200° C. in a cylinder type malaxator (roll mill). Usual additives, such as stabilizers, lubricants, and the like, may be incorporated at this stage.

The compositions according to the invention are particularly suitable for the production of injection molded objects and extruded objects, particularly sections, pipes, conduits, containers, and the like, and particularly for pipes and containers used for transporting or storing chemical products and hot liquids.

The invention will now be further illustrated by means of the following examples, which are not, however, intended to limit the scope of the invention. Examples designated only by a numeral are in accordance with the invention whereas examples designated by R followed by a numeral are reference or comparative examples.

EXAMPLES 1 TO 5

In the proportions shown in Table 1 mixtures of various substances with a chlorinated polyvinyl chloride containing 665 g. of chlorine per kg. are prepared by kneading the chlorinated polyvinyl chloride and other substances together in a roll mill. After the kneading, the resultant mass is removed and converted into sheets by pressing at 190° C.

The following various mechanical properties are then measured for these sheets:

Izod impact strength at ambient temeprature (20° C.) in accordance with the standard ASTM D–256;

Temperature of deflection under load in accordance with the standard ASTM D–648;

Flow pressure with the aid of a Macklow-Smith plastometer type R33 under the following conditions:

Diameter of die—1.59 mm.
Length of die—3.2 mm.
Speed of piston downstroke—21.7 mm. per minute
Rate of flow—6.7 cc. per minute The results of these tests are shown in Table 1 below and clearly indicate that the compositions based on chlorinated polyvinyl chloride and ethylene-ethyl acrylate copolymer (Examples 4 and 5) have, compared with chlorinated polyvinyl chloride alone (reference Example R1) and with mixtures of chlorinated polyvinyl chloride and ethylene-vinyl acetate copolymer (reference Examples R2 and R3), lower viscosity at high temperature and consequently improved workability. Their impact strength is moreover decidedly improved. In addition, the incorporation of ethylene-alkyl acrylate copolymers has practically no unfavorable effect on thermoresistance (temperature of deflection under load).

TABLE 1

| Composition, g. | Example | | | | |
|---|---|---|---|---|---|
| | R1 | R2 | R3 | 4 | 5 |
| Chlorinated polyvinyl chloride containing 665 g. of Cl per kg. | 100 | 95 | 90 | 95 | 90 |
| Ethylene-vinyl acetate copolymer containing 35% by weight of vinyl acetate | | 5 | 10 | | |
| Ethylene-ethyl acrylate copolymer containing 80% by weight of ethylene | | | | 5 | 10 |
| Stabilizers and lubricants | | | 4 | | |
| Izod impact strength (20° C.) kg.·cm./cm. of notch | 2.8 | 3.7 | 9.7 | 4.1 | 13 |
| Flow pressure at 190° C., kg./cc. | 232 | 225 | 176 | 207 | 136 |
| Temperature of deflection under load, ° C | 111 | 111 | 107 | 113 | 110 |

EXAMPLES 6 TO 9

By the same procedure as in the foregoing examples, mixtures of the substances and in the proportions designated in Table 2 are prepared and subsequently sheets are prepared from the mixtures.

A butadiene graft copolymer which is sold in commerce under the name Paralloid KM 228 (Rohm & Haas) and contains approximately 32% of butadiene, 14% of styrene, and 52% of a mixture of methyl and ethyl methacrylates is used in Examples 8 and 9.

The various mechanical properties described in Examples 1 to 5 are measured for the sheets. The results of these tests are shown in Table 2 below, and clearly reveal that the resinous compositions of the invention containing an optional modifying agent according to the invention (in this case, a butadiene graft copolymer, Example 8) can exhibit, in comparison with chlorinated polyvinyl chloride (reference Example R1), with mixtures of chlorinated polyvinyl chloride and polyvinyl chloride (Example R6), and even with mixtures of chlorinated polyvinyl chloride, polyvinyl chloride, and ethylene-alkyl acrylate copolymer (Example 7), better impact strength. In addition, the incorporation of a modifying agent according to the invention is shown to have practically no unfavorable effect on thermoresistance (temperature of deflection under load) or on workability (viscosity at high temperature). Moreover, comparison of Example 8 with Examples 7 and R9 clearly shown a synergistic effect on impact strength of the constituents of the ethylenealkyl acrylate copolymer modifying agent additive system.

TABLE 2

| Composition, g. | Example | | | | |
|---|---|---|---|---|---|
| | R1 | R6 | 7 | 8 | R9 |
| Chlorinated polyvinyl chloride containing 665 g. of Cl per kg. | 100 | 70 | 70 | 70 | 70 |
| Polyvinyl chloride | | 27.4 | 27.4 | 27.4 | 27.4 |
| Ethylene-ethyl acrylate copolymer containing 80% of ethylene | | | 6.6 | 5.1 | |
| Butadiene graft copolymer | | | | 1.5 | 1.5 |
| Stabilizers and lubricants | | | 4 | | |
| Izod impact strength (20° C.) kg.·cm./cm. of notch | 2.8 | 4.2 | 12.9 | 19.3 | 5 |
| Flow pressure at 190° C., kg./cc. | 232 | 189 | 117 | 105 | 187 |
| Temperature of deflection under load, ° C | 111 | 106 | 97 | 99 | 105 |

EXAMPLES 10 TO 14

Starting with compositions prepared on a roll mill, containing the ingredients indicated in Table 3 below, tubes are extruded the impact strength of which is measured by a statistical method known as the "staircase" method, which is described below.

The values of the impact strengths of tubes given in Table 3 below correspond to the energy of fall of a body causing the fracture of 50% of the samples of tubes of a given composition.

A sample of tube, having in all cases a length of 10 cm., an outside diameter of 16 mm. and an inside diameter of 12 mm., is laid over its entire length in the hollow of a V-shaped support, and at the middle of its length receives the impact of a weight falling in free fall from a fixed height. The height of fall of the weight is fixed at a value of 0.5, 1, or 2 meters, and the weight is varied by fixed increments or decrements, depending on whether the preceding tube of the same composition was or was not broken in the course of the test.

The value of the impact strength of tube of a given composition is equal to the product of the height and the magnitude of the weight corresponding statistically to the fracture of 50% of the samples of tube of the same composition.

An ethyl acrylate-methyl methacrylate copolymer which contains 90% of methyl methacrylate and is sold in commerce under the name Paralloid K 120 N (Rohm & Haas) is used in Example 13.

The results of the impact strength tests on the tubes are given in Table 3 and clearly show that tubes made from the compositions of the invention containing an optional modifying agent according to the invention (in one case, a butadiene graft copolymer, Example 12, and in another case, an ethyl acrylate-methyl methacrylate copolymer, Example 13) can withstand impacts decidedly better than tubes produced from mixtures of chlorinated polyvinyl chloride and polyvinyl chloride (Example R10) or even from chlorinated polyvinyl chloride, polyvinyl chloride, and ethylene-alkyl acrylate copolymer (Example 11). It will also be noted that the compositions including both the ethylene-alkyl acrylate copolymer and the ethyl-acrylate-methyl methacrylate copolymer can be extruded into a tube, whereas those containing as additive the ethyl acrylate-methyl methacrylate copolymer alone do not enable this to be done (Example R14).

TABLE 3

| Composition, g. | Example | | | | |
|---|---|---|---|---|---|
| | R10 | 11 | 12 | 13 | R14 |
| Chlorinated polyvinyl chloride containing 665 g. of Cl per kg | 80 | 80 | 80 | 80 | 80 |
| Polyvinyl chloride | 20 | 20 | 20 | 20 | 20 |
| Ethylene-ethyl acrylate copolymer containing 80% of ethylene | | 6 | 5 | 5 | |
| Butadiene graft copolymer | | | 1.5 | | |
| Ethyl acrylate-methyl methacrylate copolymer | | | | 1 | 1 |
| Stabilizers and lubricants | | | 4 | | |
| Impact strength of tube a, kg.-m | 0.065 | 0.095 | 0.117 | 0.203 | (b) | a By Solvay test described hereinabove.
b Not extrudable.

While the invention has been described by particular description of preferred embodiments thereof, it is to be understood that such description is not intended to limit the scope of the invention since modifications and variations of what is described herein which are obvious to one skilled in the art are intended to be encompassed in the scope of the appended claims.

What we claim and desire to secure by Letters Patent is:

1. A resinous composition of improved processability and impact strength, comprising 99.5% to 80% by weight of chlorinated polyvinyl chloride containing 600 to 750 grams of chlorine per kilogram and 0.5% to 20% by weight of a copolymer of ethylene and an alkyl ester of an acid selected from the group consisting of acrylic acid and substitution derivatives of acrylic acid, the proportion of ethylene units in said copolymer being 10% to 90% by weight.

2. A composition according to claim 1, in which said alkyl ester is selected from the group consisting of alkyl acrylates and alkyl methacrylates.

3. A resinous composition of improved processability and impact strength, comprising 99% to 40% by weight of chlorinated polyvinyl chloride containing 600 to 750 grams of chlorine per kilogram, 0.5 to 50% by weight of polyvinyl chloride and 0.5 to 20% by weight of a copolymer of ethylene and an alkyl ester of an acid selected from the group consisting of acrylic acid and substitution derivatives of acrylic acid, the proportion of ethylene units in said copolymer being 10% to 90% by weight.

4. A composition according to claim 3, in which said alkyl ester is selected from the group consisting of alkyl acrylates and alkyl methacrylates.

5. A composition according to claim 1, further comprising 0.1% to 5% by weight, based on the weight of the chlorinated polyvinyl chloride, of a modifying agent selected from the group consisting of
   (a) graft copolymers obtained by grafting, on a diolefin polymer, at least one monomer selected from the group consisting of alkyl acrylates, styrene and acrylonitrile; and
   (b) copolymers and terpolymers obtained by interpolymerization of at least two monomers of the group consisting of alkyl acrylates, styrene, acrylonitrile, butadiene and substitution derivatives thereof.

6. A composition according to claim 3, further comprising 0.1% to 5% by weight, based on the weight of the chlorinated polyvinyl chloride, of a modifying agent selected from the group consisting of
   (a) graft copolymers obtained by grafting, on a diolefin polymer, at least one monomer selected from the group consisting of alkyl acrylates, styrene and acrylonitrile; and
   (b) copolymers and terpolymers obtained by interpolymerization of at least two monomers of the group consisting of alkyl acrylates, styrene, acrylonitrile, butadiene and substitution derivatives thereof.

7. A shaped article constituted of a resinous composition of improved processability and impact strength, comprising 99.5% to 80% by weight of chlorinated polyvinyl chloride containing 600 to 750 grams of chlorine per kilogram and 0.5% to 20% by weight of a copolymer of ethylene and an alkyl ester of an acid selected from the group consisting of acrylic acid and substitution derivatives of acrylic acid, the proportion of ethylene units in said copolymer being 10% to 90% by weight.

8. A shaped article constituted of a resinous composition of improved processability and impact strength, comprising 99% to 40% by weight of chlorinated polyvinyl chloride containing 600 to 750 grams of chlorine per kilogram, 0.5 to 50% by weight of polyvinyl chloride and 0.5 to 20% by weight of a copolymer of ethylene and an alkyl ester of an acid selected from the group consisting of acrylic acid and substitution derivatives of acrylic acid, the proportion of ethylene units in said copolymer being 10% to 90% by weight.

9. A shaped article according to claim 7, further comprising 0.1% to 5% by weight, based on the weight of the chlorinated polyvinyl chloride, of a modifying agent selected from the group consisting of
   (a) graft copolymers obtained by grafting, on a diolefin polymer, at least one monomer selected from the group consisting of alkyl acrylates, styrene and acrylonitrile; and
   (b) copolymers and terpolymers obtained by interpolymerization of at least two monomers of the group consisting of alkyl acrylates, styrene, acrylonitrile, butadiene and substitution derivatives thereof.

10. A shaped article according to claim 8, further comprising 0.1% to 5% by weight, based on the weight of the chlorinated polyvinyl chloride, of a modifying agent selected from the group consisting of
  (a) graft copolymers obtained by grafting, on a diolefin polymer, at least one monomer selected from the group consisting of alkyl acrylates, styrene and acrylonitrile; and
  (b) copolymers and terpolymers obtained by interpolymerization of at least two monomers of the group consisting of alkyl acrylates, styrene, acrylonitrile, butadiene and substitution derivatives thereof.

11. A composition according to claim 1 in which the proportion of ethylene units in said copolymer is 50% to 90% by weight.

12. A composition according to claim 1 in which said copolymer of ethylene and said alkyl ester is present in an amount of 2.5 to 15% by weight and in which said alkyl ester is selected from the group consisting of alkyl acrylates and alkyl methacrylates.

References Cited

UNITED STATES PATENTS 3,218,373  11/1965  Salyer _____ 260—878

FOREIGN PATENTS 924,457  4/1963  Great Britain _____ 260—897
1,405,362  5/1965  France _____ 260—897

MURRAY TILLMAN, Primary Examiner

C. J. SECCURO, Assistant Examiner

U.S. Cl. X.R.

260—890, 891, 892, 893, 897, 899